May 11, 1965
N. VARJU
3,182,508
GOLF DRIVE METERING APPARATUS
Filed May 22, 1962
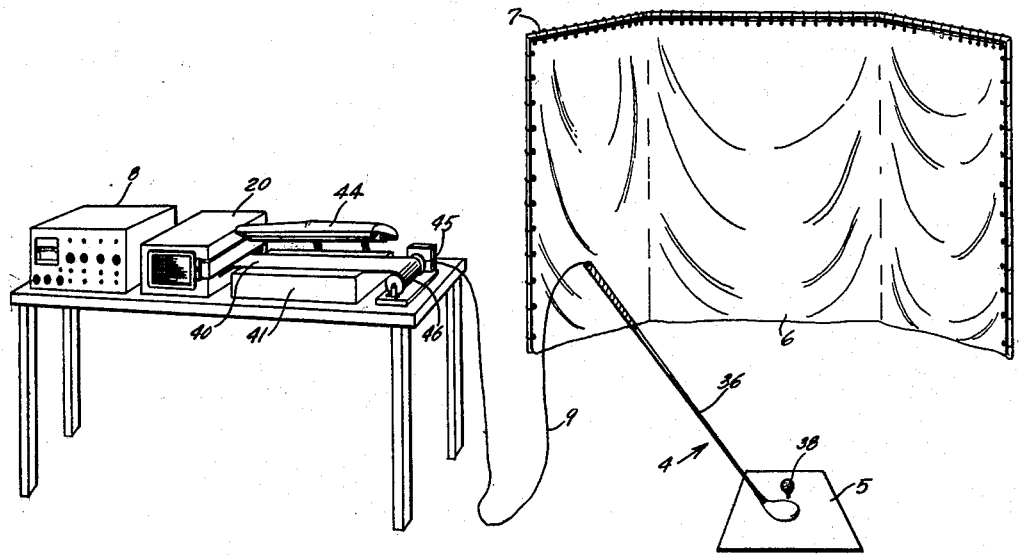
Fig. 1
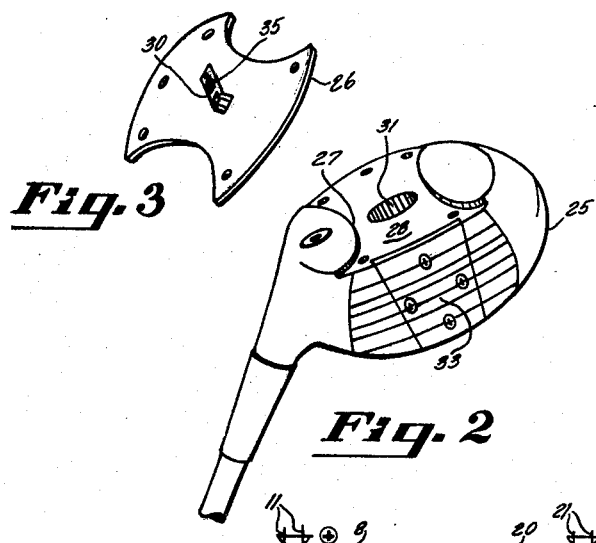
Fig. 3
Fig. 2
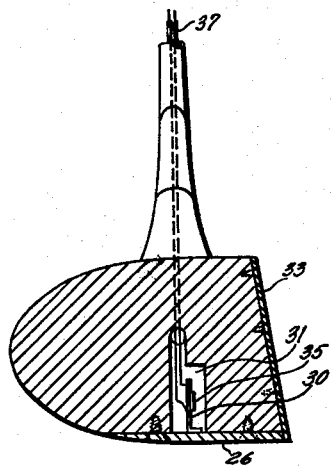
Fig. 4
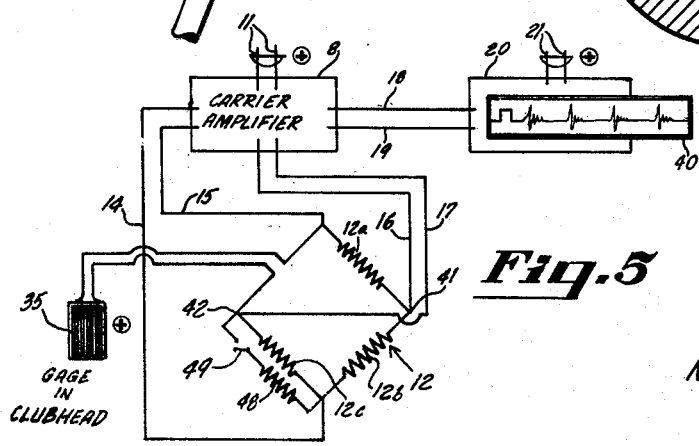
Fig. 5
INVENTOR.
NICHOLAS VARJU
BY Henry Kozak
ATTORNEY

United States Patent Office 3,182,508
Patented May 11, 1965

3,182,508
GOLF DRIVE METERING APPARATUS
Nicholas Varju, Parma, Ohio, assignor to National Castings Company, Cleveland, Ohio, a corporation of Ohio
Filed May 22, 1962, Ser. No. 196,654
7 Claims. (Cl. 73—379)

This invention relates to apparatus for measuring impacts of a golf club upon a standard golf ball wherein electrical impact-sending equipment is carried in an especially adapted club capable of transmitting a signal proportional to the intensity of impact to an indicating mechanism maintained remotely from the club.

It is a primary object of this invention to provide a portable game-type golf-ball-driving apparatus which cannot be readily damaged through misuse or rough handling of the club. That is to say, the parts of the drive-indicating mechanism which are necessarily carried in the club are inherently simple and of sturdy construction.

It is also an object to provide the apparatus of the foregoing object with indicating mechanism capable of a high degree of accuracy, capable of checking itself for accuracy, and is conveniently and instantaneously correctable to a desired mode of indication.

It is a further object to provide a new game device adapted for non-commercial use as well as by the entrepreneur who uses it for income purposes.

Briefly speaking, the invention is provided in a specially constructed golf club and indicating apparatus electrically connected therewith which translates an electrical signal from the club into visual indicia which quantitatively indicate the magnitude of the impact of the club with a preferably standard golf ball.

Accordingly, the apparatus includes a golf club of which the head provides a striking face and a cavity inwardly from the striking face, a small elongate element fixed in cantilever fashion to a support, such as the soleplate of the club, to dispose the element inside the cavity with its length approximately parallel to the striking face of the head. Preferably, the element has a natural half-period of vibration which is substantially less than the normal period during which force is applied to the golf ball by the club.

The apparatus further comprises a conductor carried by the element on a side thereof facing in a direction extending toward and away from the striking face of the club. The conductor is connected at points thereof which are spaced along the conductor in the lengthwise direction of the element within a circuit containing also a constant voltage energy source to establish a current which may be varied in said circuit in accordance with the bending deflection of the element and the conductor joined thereto.

The apparatus further comprises electrically operated mechanism cooperating with the above circuit which is responsive to changes of the current therein.

In a preferred embodiment, a constant voltage current source is connected with input terminals of a Wheatstone bridge of which the conductor attached to the element is an arm. The output terminals of the Wheatstone bridge are then available as a source for a signal current which is connected with and used to actuate an amplifier. The apparatus further includes an oscillograph which is in turn actuated by the output current of the amplifier.

In the drawing in respect to which this invention is described:

FIG. 1 is a perspective view of substantially all of the apparatus entailed in the practice of the present invention.

FIG. 2 is a fragmentary perspective view of the head of a golf club with the underside thereof in the foreground and the sole-plate removed.

FIG. 3 is a perspective view of a sole-plate shown detached from the head of FIG. 2 with its upper side toward the viewer.

FIG. 4 is a fragmentary cross section of a golf club showing the the head and associated components in assembled condition.

FIG. 5 is a circuit diagram of the apparatus shown in FIG. 1.

FIG. 1 depicts in perspective a typical installation utilizing the present invention. As shown, a golf club 4 is maintained in close proximity with a tee-off platform 5 enclosed on three sides by a curtain 6 suspended from a rail 7. The club is electrically connected by a two-wire cord 9 with a four-channel carrier amplifier 8 capable, as shown in FIG. 5, of being energized through terminals 11, e.g., from a commercial 110 volt 60 cycle circuit. The amplifier 8 produces a supply current for a Wheatstone bridge 12 through lines 14 and 15. The amplifier 8 also receives the output current of the Wheatstone bridge through lines 16 and 17 for purposes of amplification. The amplified current produced by the amplifier 8 is transmitted through lines 18 and 19 to a conventional oscillograph 20 energized by, e.g., 110 volt 60 cycle supply circuit, through terminals 21.

The golf club 4 is preferably of conventional shape, size, weight, and construction except for the modifications adapting it to the present invention. The head 25 thereof is typical of a "driver" and may be constructed primarily of wood as are conventional drivers. The head is conventional in a further sense by inclusion of a metal "sole-plate" 26 which is received in the recess 27 of the foreground undersurface 28 of the club as shown in FIG. 2.

A flat cantilever element 30 of elongate tab-like conformation is attached to the upper surface 29 of the sole-plate, i.e., that surface facing toward the viewer in FIG. 3. The element 30 may comprise any rigid material which is capable of withstanding indefinite service of the club. However, spring steel is the preferred material used to date and is the material in mind as the invention is now described.

The sole-plate 26, when secured to the head as shown in FIG. 4, disposes the element 30 in a cavity 31 having its opening in the recessed undersurface of the wood portion of the head, as shown in FIG. 2. In operative position, the element 30 has ample clearance with the surfaces of the head defining the cavity to permit free elastic movement of that portion of the element in cantilever relation with the sole-plate. The flat sides of the element are approximately parallel to a striking face 33 of the club head along which a golf ball is engaged.

It is essential that the element 30 be of a mass, construction, and shape so that its natural frequency of resonant vibration shall bear a desired relation with the duration of the impact period of the club with a ball. It is observed that the best results are obtained on the oscillograph if the half-period of the natural frequency of the element 30 is substantially less than the period or pulse of force characterizing the impact of the club with the ball. This period is in the order of 0.001 of a second. When the force of this impact is plotted in relation to time, an approximate sine curve is obtained. When the element 30 is of proper mass and proportion, the half-period of its natural frequency is also a sine curve of considerably less length along the time ordinate. This is a condition conducive to accurate reproduction of the force curve upon the oscillograph.

Hence, the electrical system embodied in the equipment illustrated in FIG. 1, and also illustrated by circuit diagram in FIG. 5 enables the user to measure the amount of deceleration to which the golf club is subjected upon impact with a golf ball. Since the deceleration is proportional to impact force it will also permit the measurement of the impact force common to both the club and the ball. There is an approximate correlation between impact force and the distance the ball travels. If other variables, such as physical characteristics of the ball, atmospheric conditions, slice and hook strokes, and trajectory angle are disregarded, the impact force measured is an approximate measure of the distance the ball would travel in actual play.

In one preferred embodiment, a resistance foil-grid 35, which may take the form of the commonly known strain gage, is cemented to the element 30 formed of spring steel. A layer of epoxy resin film electrically insulates the grid from the element 30. The head 25 and the handle 36 are provided with suitable bores to accommodate a shielded cable 37 comprising a pair of conductors connected to the extremities of the conducting filament typically arranged in serpentine convolutions within the grid 35. The cable 37 extends from the cavity 31 lengthwise of the club to the end of the handle and thence to the amplifier 8. This amplifier is preferably a commercial type, such as the 4-channel carrier amplifier type 1-118 manufactured by The Consolidated Electrodynamics Corporation of Pasadena, California. The grid 35 is obtainable as a commercial model from The Budd Company of Philadelphia, Pennsylvania, known as "metal film gage No. C6-141B."

As the golf club 4 is swung prior to impact with the ball, the element 30 remains rigid relative to the soleplate 26. When the ball 38 is struck, the club head decelerates rapidly to cause a deflection of the free end of the element. The resistance grid 35 experiences strains similar to those produced on the surface of the element 28 and hence the electrical resistance of the foil or grid varies proportionally with the strains. On account of the position of the grid 35 as one arm within the Wheatstone bridge 12, proportional current fluctuation is produced in the circuit including the output terminals 41 and 42 of the Wheatstone bridge, the lines 16 and 17, and the signal-receiving section of the amplifier 8. The resistance units of the other three arms 12a, 12b, and 12c may be provided as strain gages of construction identical to that of the grid 35 in accordance with actual reduction to practice of the invention. This signal is amplified into a strong signal current for the oscillograph 20 as conducted through lines 18 and 19. The oscillograph 20 scribes a curve on a continuous sheet of paper 40 illustrating acceleration versus time.

The commercially available oscillograph heretofore used in practicing this invention and in mind as this invention is herein described, is the "Visicorder" Model 9066 manufactured by The Minneapolis Honeywell Regulator Company. Actual scribing of a curve is accomplished by an electronically controlled ultraviolet light beam projected onto the paper 40 near the paper-discharging end of the machine from a mirror actuated galvanometer. This galvanometer responds to the carrier amplifier outcurrent.

The paper 40 is discharged preferably at a slow rate, e.g., ½ inch per second onto a viewing platform 41. "Kodak Linograph," direct print specification 2-inch, manufactured by Eastman Kodak Company of Rochester, New York and "Du Pont No. 7 Linowrit 5" manufactured by the E. I. Du Pont de Nemours & Company of Wilmington, Delaware, are ultraviolet sensitive papers on which patterns of exposure to ultraviolet light will appear as the paper becomes developed by passage under a fluorescent lamp 44 mounted on the platform 41. After passage from the platform, the paper is wound on an electrically driven mandrel 45 into a roll 46.

A calibrating facility for the apparatus is provided as a resistance unit 48 in parallel circuit relation with one leg of the Wheatstone bridge other than the grid 35 carried in the golf club. This resistance is activated when desired by a switch 49 in series therewith. As shown, the resistance unit 48 is parallel to the arm 12c. By actual field use of the equipment, the length of the golf drive is ascertained which will produce a curve by the oscillograph on the paper 40 of the same height as that produced thereon by closing the switch 49 and thus activating the resistance 48. With this information the oscillograph may be adjusted periodically to standard chart calibration. The paper 40 may then be furnished with indicia spaced widthwise of the paper to provide a direct reading in yards of golf drive. The height of the curve is the information required to establish the length of a golf drive. The length of the curve is not material. Presently available chart paper is usually graduated widthwise in inches and the curves representing forces measured by the oscillograph are recorded in geometric proportions in respect to inches of width. In this case, it is desirable to have a separate chart or scale for translating inches of width of signal indicated on the paper into yards of golf drive. The data for preparing such a scale is obtained by field trial through observation of the response of the oscillograph to a number of drives varying in length.

The terms and expressions which have been employed are used as terms of description and not of limitation and there is no intention of excluding such equivalents of the invention described or of the portions thereof as fall within the scope of the claims.

What is claimed is:

1. Apparatus for producing a signal current for measuring a golf drive comprising:
   (A) a golf club having a head providing a striking face and a cavity disposed inwardly from the striking face;
   (B) an elongate element adapted to be received in said cavity generally parallel to said face, said element having a side facing toward and a side facing away from said striking face;
   (C) a support fixed to one end of the element and to the head to dispose the element inside said cavity with the length of the element approximately parallel to said striking face;
       the surfaces defining said cavity being spaced from said element to provide free elastic deflection thereof in response to impact forces normal to golf play sustained by the head;
   (D) an electrical conductor carried by said element and extending in the lengthwise direction of the element;
       said conductor being attached to a one of said sides of the element; and
   (E) an electrical circuit including a constant voltage energy source and at least a section of said conductor connected within the circuit at points of connection spaced along the conductor in the lengthwise direction of the element for generating a signal current in said circuit varying in accordance with the deflection of said element and said section toward the striking face.

2. An apparatus for producing a signal current adapted for measuring a golf drive comprising:
   (A) a golf club having a head providing a striking face and a cavity disposed inwardly from the striking face;
   (B) a flat tab-like element;
   (C) a support fixed to one end of the element and to the head to dispose the element inside said cavity with the flat sides of the element approximately parallel to said striking face;
       the surfaces defining said cavity being spaced from said element to provide free elastic deflection of the element in response to impact forces normal to golf play sustained by the head;
   (D) a serpentine electrically-conductive, electrically-insulated filament attached to one face of the element and formed in convolutions extending in a direction toward and away from the point of attachment of the element to the support; and
   (E) an electrical circuit including a constant voltage energy source and said filament wherein deflection of said element and said convolutions toward said striking face effects variations of current in said circuit.

3. An apparatus for producing a signal current for measuring a golf drive comprising:
(A) a golf club having
(1) a head providing a striking face and a cavity disposed inwardly from the striking face and extending upwardly from an opening thereof in an undersurface of the head, and
(2) a sole plate secured to said undersurface and covering said cavity;
(B) a flat tab-like element fixed by one end to said sole-plate in cantilever relation therewith and extending upwardly within said cavity with its flat sides in approximate parallel relation with said face,
said element having clearance with the surfaces defining said cavity to permit free elastic deflection in response to impact forces normal to golf play sustained by the head;
(C) a serpentine electrically-conductive, electrically-insulated filament attached to one face of the element and formed in convolutions extending toward and away from the point of attachment to said plate;
(D) a constant voltage energy source supported in detached relation with said club; and
(E) a pair of parallel conductors extending from the ends of at least a section of said filament in lengthwise attached relation with the club and flexibly from the club to said energy source;
(F) an electrical circuit including said filament, conductors, and energy source connected in series circuit relationship wherein the current varies in accordance with deflection of said element and said convolutions toward said striking face.

4. Apparatus for measuring a golf drive comprising:
(A) a golf club having a head providing a striking face and a cavity inwardly of the striking face;
(B) a flat tab-like element;
(C) a support fixed to one end of the element and to the head to dispose the element inside said cavity with the flat sides of the element approximately parallel to said striking face;
the surfaces defining said cavity being spaced from said element to provide free elastic deflection thereof in response to impact forces normal to golf plays sustained by the head;
(D) an electrical conductor carried by said element extending in a direction toward and away from the point of attachment to the element to the support;
(E) a Wheatstone bridge comprising as one arm thereof a section of said conductor of which the electrical termini are spaced along said conductor in said direction; and
(F) a constant voltage energy source connected with the input terminals of the Wheatstone bridge; and current-sensitive electrical means connected with the output terminals of the Wheatstone bridge for indicating changes of current through the output terminals.

5. The apparatus of claim 4 wherein the current sensitive means comprises:
(A) an oscillograph; and
(B) an amplifier connected between said output terminals and the oscillograph.

6. The apparatus of claim 4 wherein: said one arm is adjacent one input terminal and a calibrating resistor is connected between the other input terminal and an output terminal; and
(A) the apparatus comprises switch means for selectively energizing the calibrating resistor whereby the effect thereof, when energized, upon said oscillograph may be equated with a golf drive of normal flight.

7. In an apparatus for producing a signal current for measuring a golf drive comprising:
(A) a golf club having a head providing a striking face and a cavity;
(B) a flat tab-like element;
(C) a support fixed to one end of the element and to the head to dispose the element inside said cavity with the flat sides of the element approximately parallel to said striking face;
the surfaces of the head defining said cavity being spaced from said element to provide free elastic deflection thereof in response to impact forces normal to golf play sustained by the head; and
said cantilever element having a mass providing a natural resonant frequency of which one half of its cycle period is appreciably less than the force-application period during impact of the club with a golf ball.

References Cited by the Examiner

UNITED STATES PATENTS

| | | | |
|---|---|---|---|
| 1,876,657 | 9/32 | Fox | 73—380 |
| 2,487,793 | 11/49 | Esval et al. | 318—489 |

OTHER REFERENCES

Pages 92, 93, and 78, 1955, "The Strain Gage Primer."

RICHARD C. QUEISSER, *Primary Examiner.*
JOSEPH P. STRIZAK, *Examiner.*